April 21, 1942. G. F. ZELLHOEFER 2,280,210
GENERATOR
Filed Dec. 16, 1938
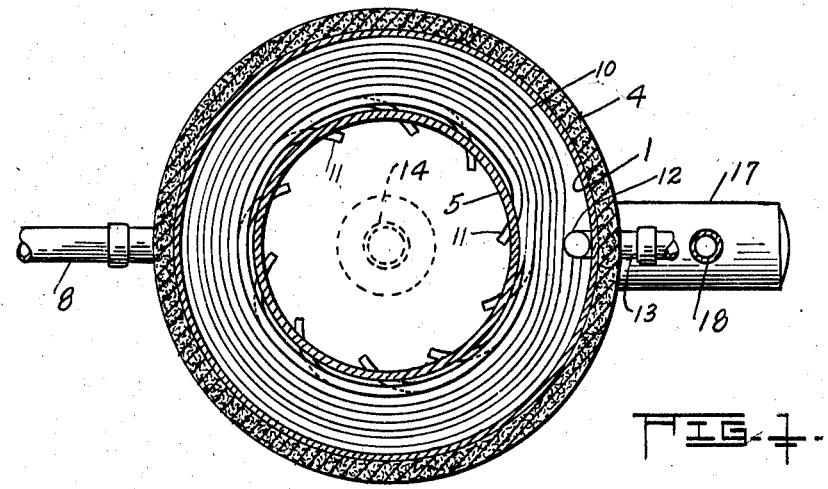
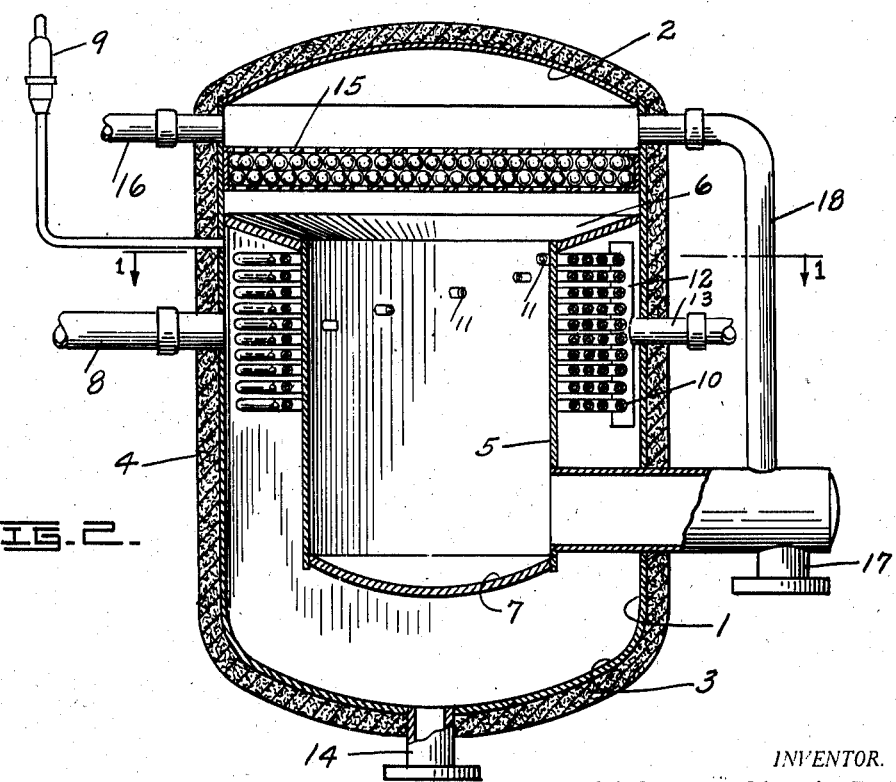
INVENTOR.
GLENN ZELLHOEFER
BY
ATTORNEY.

Patented Apr. 21, 1942

2,280,210

UNITED STATES PATENT OFFICE 2,280,210

GENERATOR

Glenn F. Zellhoefer, Bloomington, Ill., assignor to Williams Oil-O-Matic Heating Corporation, Bloomington, Ill., a corporation of Illinois Application December 16, 1938, Serial No. 246,030

3 Claims. (Cl. 202—200)

This invention relates to improvements in heaters or generators for absorption type refrigerating apparatus.

In the absorption type of refrigerating apparatus, the generator is employed to distill a gaseous refrigerant from a solution of the refrigerant and a suitable solvent. It is common practice to accomplish this distillation by spraying the solution over the exterior of a series of coils heated by steam passing through the coils that are mounted within the generator assembly, such as shown in the applicant's prior Patent No. 2,107,320, of February 8, 1938. A steam coil such as disclosed in said prior patent, using a one to four ratio between the prime and extended surface, affords a rate of heat transfer of approximately 35 B. t. u.'s per hour per square foot per degree, based on the total surface, when used in conjunction with an absorption refrigerating machine utilizing methylene chloride as a refrigerant and dimethyl ether of tetraethylene glycol as a solvent.

It is an object of this invention to provide a generator in which the solution of solvent and refrigerant is pumped through a series of coils mounted within a steam jacket and thereafter discharging the heated solution and refrigerant vapors into a separating chamber. Herein refrigerant vapors are freed from substantially all the entrained solution and may be passed therefrom to the condenser of the refrigerating apparatus. The solvent freed from a large portion of the refrigerant is removed from the vaporization chamber and may be recirculated in the refrigerating apparatus through a heat exchanger to an absorption chamber for reabsorption of low pressure refrigerant vapor. The construction herein described provides a heat transfer rate as high as approximately 425 B. t. u.'s per hour per square foot per degree when designed for moderate pressure drop of the solution and gas through the coil, and when used in conjunction with an absorption refrigerating machine utilizing methylene chloride as a refrigerant and dimethyl ether of tetraethylene glycol as a solvent. This improved generator affords the ready release of refrigerant vapors so that the solvent is not appreciably, if at all, super-saturated with the refrigerant when the solvent is withdrawn from the generator. This construction further provides means for readily draining the condensate from the coils and readily releasing air from the steam in the steam jacket.

With these objects in view, reference is made to the accompanying sheet of drawings which illustrates a preferred form of this invention with the understanding that minor detail changes may be made without departing from the scope thereof.

In the drawing:

Figure 1 is a top plan view of this improved generator with parts removed and partly in section, taken on the line 1—1, Figure 2.

Figure 2 is a view in central transverse vertical section of Figure 1, with parts shown in elevation.

As shown in the drawing, a preferred embodiment of this invention includes a vertical cylindrical generator casing 1 having conical top 2 and bottom end 3 the whole being surrounded upon the exterior side with a covering of insulation 4. Centrally supported upon a division plate 6, spaced from the top 2 of the generator casing 1, is a separating chamber 5 which opens through the division plate at the top and is closed by a concave bottom 7. The division plate 6 and the walls of the separating chamber 5 divide the interior of the generator into two separate non-communicating chambers which are, respectively, a lower steam chamber or jacket and an upper separating zone, including the separating chamber 5 as shown. A steam inlet 8 is provided in the side of the generator casing 1 below the division plate 6 for introducing steam into the steam jacket and the steam jacket is further provided with a pop-off valve 9 connected to the interior of the chamber just below the division plate 6. The bottom of the chamber 5 is concave in shape to provide for the discharge of steam condensate which collects thereon and which may be removed from the steam jacket through a discharge pipe 14.

A plurality of rows of flat tubular coils 10 positioned in spaced vertical relationship are placed about the walls of the chamber 5 within the steam jacket. The inner end of each coil 11 passes tangentially through an opening into the chamber 5 communicates therewith. The outer end of each coil is joined to a vertical manifold 12 which manifold is connected by pipe 13 to a heat exchanger and solvent absorbing apparatus, not shown. By this arrangement the solution of refrigerant and solvent from the heat exchanger and solvent absorbing apparatus may be pumped through the heating coils 10 and be discharged through the ends 11 with a whirling motion into the chamber 5. A major proportion of the refrigerant vaporizes from the solvent in the coils and the mixture of vapors and entrained solvent or solution is separated in the separating chamber 5. It is preferable to stagger the ends 11 of each coil of pipe 10 which enter the chamber 5 to evenly distribute the solution entering the chamber 5. Each row of coils is spaced apart from each other and the convolutions of each coil are spaced apart to allow the ready passage of the steam about and between each coil whereby optimum heat transfer is obtained.

The heat of the steam passing through and about the coils 10 causes the gaseous refrigerant to vaporize from the solution. The vapors separate from the entrained solvent or solution in the separating chamber 5 and then escape from the open end of the chamber 5 and are preferably passed through an eliminator 15 and then conveyed by pipe 16 to the condenser coil of the refrigeration apparatus (not shown). The eliminator comprises a layer of closely spaced bodies arranged to provide a tortuous passage for the vapors whereby small particles of solvent in the form of a mist are removed from the vapors. The weak solution collecting in the chamber 5 is removed by the pipe 17 and may be discharged into a low pressure refrigerant absorbing apparatus, as indicated above. A vent 18 is provided from the top of the heater above the eliminator to the pipe 17.

What I claim is:

1. A generator adapted for use in an absorption type apparatus for separating by distillation a liquid solution of a relatively volatile refrigerant and a relatively nonvolatile solvent therefor, which comprises a separating chamber, a steam jacket enclosing said chamber, means for passing steam into said jacket and removing condensate therefrom, a plurality of flat tubular coils spaced in vertical relationship surrounding the chamber within the steam jacket with their adjacent ends opening into the chamber, said ends being arranged around the side walls of the chamber in spaced relationship around the periphery thereof and adapted to discharge said solution in a direction substantially tangential to said walls, means for introducing said solution into the opposite ends of said coils, means for withdrawing the undistilled, relatively nonvolatile solvent from the separating chamber, and means for withdrawing the relatively volatile distilled refrigerant vapors from the separating chamber.

2. A generator for distilling a liquid solution of a refrigerant and a solvent in an absorption type refrigerating apparatus, including a cylindrical casing enclosed at the ends having a separating chamber suspended therein, means forming a steam jacket about the sides and the bottom of the chamber, a plurality of spaced flat coils surrounding the chamber within the steam jacket with their inner ends opening into the chamber, said ends being arranged around the side walls of the chamber in spaced relationship around the periphery thereof and adapted to discharge said solution in a direction substantially tangential to said walls, means supplying the solution to the outer ends of the coils whereby the solution is capable of flowing through the coils in heat exchange relationship with the steam jacket and of discharging into said chamber in which the separation of the vapors from the entrained solution occurs, means for withdrawing the vapors of the distilled refrigerant from the chamber, and means for separately withdrawing the undistilled solvent from the chamber.

3. The generator of claim 2 wherein the separating chamber is suspended from a division plate secured to the side walls of the generator adjacent its top, said separating chamber being open to the space within the generator casing above the division plate, wherein an eliminator is positioned in said space interposed between the open end of the chamber and the vapor withdrawal means, and wherein a vent is provided from the space above the division plate and eliminator to the solvent withdrawing means.

GLENN F. ZELLHOEFER.